Figure 1:
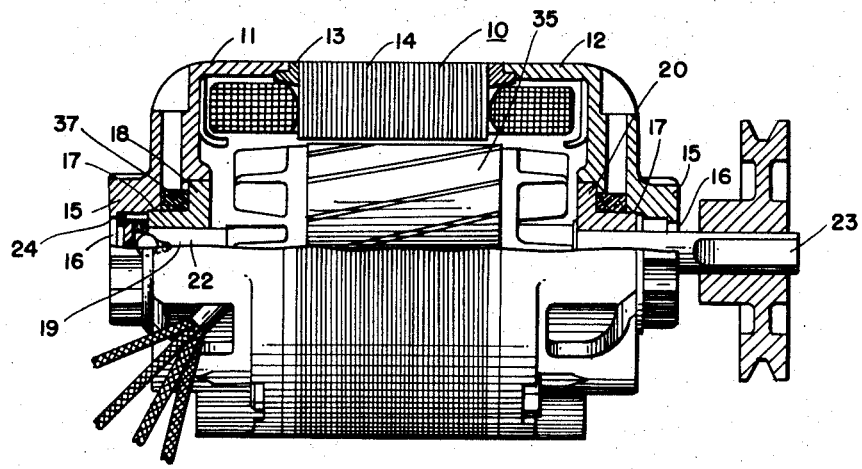

Aug. 12, 1958   L. G. SELBACH ET AL   2,847,593
ELECTRIC MOTOR
Filed April 21, 1955

INVENTORS:
LAWRENCE G. SELBACH
HAROLD C. BODINE
ROBERT R. WENTZ
DORAN O. HATFIELD

BY

ATT'YS

United States Patent Office 2,847,593
Patented Aug. 12, 1958

2,847,593

ELECTRIC MOTOR

Lawrence G. Selbach, Harold C. Bodine, Robert R. Wentz, and Doran O. Hatfield, Chicago, Ill., assignors to Bodine Electric Company, Chicago, Ill., a corporation of Illinois Application April 21, 1955, Serial No. 502,824

3 Claims. (Cl. 310—90)

This invention relates to electric motors and more particularly to an electric motor having novel means for controlling axial thrust.

Ordinary, horizontally mounted, electric motor shafts have a tendency to oscillate axially particularly when the speed is varied. A result of this condition is that a noise is produced by the intermittent contact of the rotating elements with respect to the stationary elements. In addition, a rather complex thrust bearing is necessary to withstand these pulsations.

With the foregoing in mind, a principal object of the invention is to provide an electric motor in which the thrust is directed toward one end at all speeds, and in which means of much simplified construction are provided for absorbing this thrust.

A further object of the invention is to provide a device of a stated character wherein the thrust means employed is readily replaceable for renewal and which is characterized by ease and economy of manufacture.

Another object of the invention is to provide a device of the mentioned type wherein the mounting of the conventional rotor within the housing may be effected with a minimum of adjustments during the assembly procedure.

The present invention contemplates in particular the provision of a conventional housing in which are mounted a plurality of circumferentially spaced field poles, and a rotor shaft mounted in the casing with the magnetic center of the rotor offset with respect to the field poles so that, while the motor is in operation a constant thrust is exerted in a direction opposite to that to which the rotor is offset. By this arrangement, bi-directional thrust resulting from changes of speed is eliminated, and the need for spacing washers at both ends of the shaft is obviated. In addition, proper positioning of the shaft in the housing may be accomplished by varying the thickness of but one element that is readily accessible for replacement in the event of undue wear.

A more particular object of the invention is to provide a motor of the stated type in which the housing is comprised of a pair of oppositely disposed end frames, at least one of which being formed with a hub, having an integrally formed shoulder for engagement by a snap ring for retaining the thrust disc in position. This thrust disc is in abutting relation to a thrust ball mounted in a tapered center at the end of the shaft opposite the shaft extension so that all of the thrust is directed against the disc and is effectively absorbed, and so that a space equal to the end play of the assembly will be left between the spacing washer at the extension end of the assembly and the adjacent bearing face thereby obviating the usual spacing washer noise.

Figure 2:
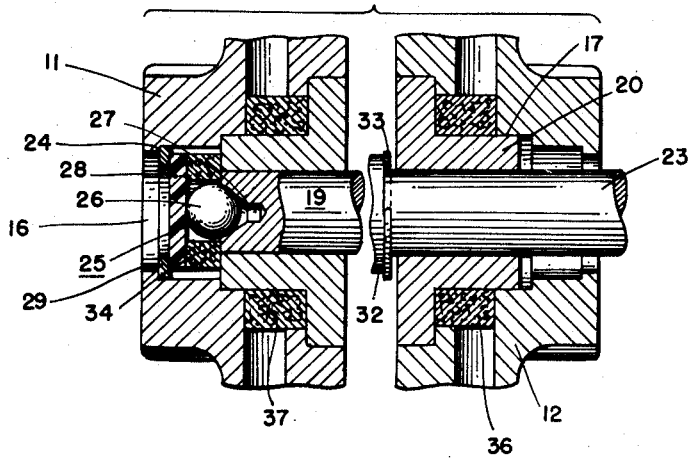

Other and further objects, advantages and features of the present invention will be apparent to those skilled in the art from the following description, taken in conjunction with the accompanying drawing in which similar reference characters relate to similar parts, and in which:

Figure 1 is an elevational view, partly in section of an electric motor made in accordance with the present invention; and Fig. 2 is an enlarged composite sectional view showing the bearing details of the device of Fig. 1.

With reference to the drawing and more particularly to Fig. 1, the electric motor of the present invention comprises essentially a housing 10 having similarly formed end frames 11 and 12 maintained in spaced relation by a field frame 13, on the inside surface of which are mounted, in circumferentially spaced relation, a plurality of field poles 14. On each of the end frames 11 and 12 is formed a hub 15 having an axial bore 16 and having associated therewith a bearing seat 17 for reception of bearings 18 and 20, which in the present instance are of the sleeve type. Journalled in the bearings 18 and 20 is a shaft 19 having a thrust end 22 and an extension end 23 for connection with a driven element such as a pulley or the like.

According to the present invention means are provided for eliminating the need for the conventional threaded end-play-adjustment plug and tapped hole in the end of the rear motor hub. Rather, in the present instance, this means takes the form of a novel thrust arrangement in which a sharp annular shoulder 24 is provided in the bore 16 in which the thrust end 22 of the shaft 19 is positioned. This arrangement includes a thrust bearing assembly 25 which cooperates with the shoulder 24 in absorbing the axial thrust of the shaft 19. The assembly 25 has a thrust ball 26 seated in a tapered center 27 in the thrust end 22 of the shaft 19. A thrust disc 28 is retained in engagement with the ball 26 by means of a snap ring 29 which in turn is engaged by the annular shoulders 24. This disc may be of metal or a suitable wear resistant material such as nylon or the like.

By the present arrangement noise resulting from rattling of the conventional spacing washers is eliminated. In this connection, reference is made to Fig. 2 in which the extension end 23 of the shaft is shown formed with a shoulder 32. In conventional machines, the spacing washers are mounted on the shaft in abutting relation to the shoulder 32 and the inner face of the bearing 20 for proper positioning of the shaft with respect to the housing. According to the present invention these washers are replaced by a single washer 33 which, during operation of the motor, is spaced from the inner face of the bearing 20 a distance equivalent to the entire end play of the assembly and is desirably of wear resistant material such as nylon or the like. The thickness of the thrust disc 28 may be varied to permit any desired degree of end play and to compensate for minute variations or manufacturing tolerance in the normal distance between the shoulder 32 and the seat for the bearing 20. In the present instance the end frames 11 and 12 are desirably die cast, and it has been found that any variation found to exist will be consistent in an entire run of end frames. With this in mind the necessary thickness of the disc 28 can be determined from the first frames of a casting run and all of the discs for that particular run may be dimensioned accordingly. For maintaining the disc 28 in substantially parallel relation to the end of the shaft 19, and for holding a lubricant, a sealing ring 34, which may be a felt washer, is mounted between these two elements.

According to another important feature of the present invention means are provided to exert a steady thrust on the thrust end of the shaft 19 despite fluctuations in speed. This feature has been found to be effective in vertical mounting as well as horizontal installations. With reference now to Fig. 1 a rotor 35 is mounted on the shaft 19 offset axially slightly to the right, as viewed in that figure. The magnetic center is thus moved to the right and the result is that a strong magnetic pull is exerted, urging the rotor 35, and consequently the shaft 19 to the left. In this position the thrust is transmitted by means of the ball 26, the disc 28 and the snap ring 29, to the end frame 11. Since the thrust is always on the disc 28, the single washer 33 is sufficient for reducing abrasion between the shoulder 32 and the inner face of the bearing 20 when the motor is accelerating or decelerating. No appreciable decrease in the efficiency of the motor has been noticed to have resulted from this displacement of the rotor.

In assembling the motor of the present invention, an oil ring 36 is mounted on the bearing 20 and this unit is placed in the seat 17 of the end frame 12. The washer 33 is then slipped over the extension end 23 of the shaft 19 and this end is passed through the bore of the bearing 20. The housing 10 is then slipped over the rotor 35. An oil ring 37 and the bearing 18 are then positioned in the end frame 11 and the thrust end 22 of the shaft 19 is slipped into the bearing 18. Once the end frame 11 is secured to the housing 10 the ball 26 is seated in the tapered center 27 and the ring 34 is then placed in operative position and a disc 28 of desired thickness is retained in position by the snap ring 29.

In operation of the present device shaft pulsations are kept to a minimum because of the fact that a constant axial thrust is exerted in one direction while the motor is in operation. This factor is particularly important where the motors of this type are used in conjunction with flexible cables which are characterized by a tendency to snap as a result of shaft pulsations. Furthermore, the present device exhibits great economy of manufacture over known structures which require machining operations to obtain a reasonably accurate thrust bearing seat. In the present instance the shoulder 24 is cast into the end frame 11 and tolerance variations are compensated by merely varying the thickness of the washer 28.

It will be apparent that this invention may be embodied in constructions which differ in many respects and details from the particular embodiment disclosed. All modifications which do not go beyond the scope of the invention will readily suggest themselves to those skilled in the art. It is, therefore, not intended that the invention be limited to the exact instruction shown and described, but only to the inventive concept as defined in the appended claims.

We claim:

1. In an electric motor having a housing and a plurality of circumferentially spaced field poles mounted in said housing, said housing having a pair of oppositely disposed hubs formed to provide seats for a pair of bearings and a bearing mounted in each of said seats, the improvement comprising a shaft mounted on said bearings and having an annular shoulder adjacent one of said bearings, a rotor mounted on said shaft in a manner that the magetic center thereof is offset axially with respect to said field poles in the direction of said shoulder with the result that during operation of the motor a constant thrust is exerted on the shaft in a direction opposite to the direction of offset, said shaft having a tapered center at the end adjacent the other of said bearings and a ball seated in said center, the hub mounting the other of said bearings being formed with an inwardly facing shoulder outwardly of the bearing seat, a thrust disk disposed in engagement with said ball, and a snap ring in abutting relation to said hub shoulder and operable to retain said disk in position against said ball, said shoulder on said shaft being normally spaced a predetermined distance from the bearing adjacent thereto when said motor is in operation and said disk having a thickness proportioned to establish said predetermined distance.

2. An electric motor comprising a housing having a pair of oppositely disposed end frames, a hub formed in each end frame and each of said hubs having an axial bore therethrough and a bearing seated in the said bore, at least one of said hubs having an annular shoulder adjacent the outer end of its bore, a rotor shaft extending through said housing and journaled in said bearings, said shaft having an annular shoulder facing and normally spaced from the bearing seated in the other of said hubs, a disk mounted in the bore of said one hub and normal to the shaft axis to absorb thrust from said shaft, a ball disposed between said disk and the adjacent end of said shaft, and a snap ring mounted in engagement with said hub shoulder for retaining said disk in said one hub bore, said disk having a thickness predetermined to establish a predetermined maximum space between the said shaft shoulder and the bearing in the other of said hubs.

3. An electric motor assembly comprising, in combination, a housing having a pair of oppositely disposed end frames and a plurality of angularly spaced field poles, a hub formed in each end frame, each of said hubs being provided with an axial bore therethrough and a bearing seat, one of said bores being provided with an inwardly facing annular shoulder, a bearing seated in each of said hubs, a shaft having a thrust end and an extension end journaled in said bearings with the thrust end in adjacent relation to said shoulder, said shaft having an annular shoulder adjacent the bearing for the said extension end, a rotor mounted on said shaft, said rotor being offset axially with respect to said field poles so that a constant thrust is exerted towards said thrust end when said motor is operating, and means for absorbing said thrust, said means including a tapered center formed in the thrust end of said shaft, a thrust ball seated in said center, a disk engaging said thrust ball and arranged in substantially normal relation to the shaft axis, and a snap ring in engagement with said hub shoulder and operative to retain the disk in engagement with said ball, said disk having a thickness predetermined to provide a predetermined maximum axial spacing of the said shaft shoulder from the extension end bearing when said motor is operating.

References Cited in the file of this patent

UNITED STATES PATENTS

| | | |
|---|---|---|
| 1,746,004 | Marshall | Feb. 4, 1930 |
| 1,916,909 | Stewart | July 4, 1933 |
| 1,971,463 | Rothe et al. | Aug. 28, 1934 |
| 2,701,845 | Gallagher | Feb. 8, 1955 |